United States Patent
Melz et al.

(10) Patent No.: US 7,637,359 B2
(45) Date of Patent: Dec. 29, 2009

(54) MODULAR INTERFACE FOR DAMPING MECHANICAL VIBRATIONS

(75) Inventors: Tobias Melz, Herdweg (DE); Michael Matthias, Herdweg (DE); Holger Hanselka, Heinrich-Delp-Str. (DE); Sven Herold, Gross-Umstadt (DE)

(73) Assignee: Fraunhofer-Gesellschaft zur Forderung der Angewandten Forschung E.V., Munich (DE)

( * ) Notice: Subject to any disclaimer, the term of this patent is extended or adjusted under 35 U.S.C. 154(b) by 340 days.

(21) Appl. No.: 10/565,469

(22) PCT Filed: Jul. 16, 2004

(86) PCT No.: PCT/EP2004/007986

§ 371 (c)(1),
(2), (4) Date: Jan. 19, 2006

(87) PCT Pub. No.: WO2005/010399

PCT Pub. Date: Feb. 3, 2005

(65) Prior Publication Data
US 2006/0225977 A1    Oct. 12, 2006

(30) Foreign Application Priority Data
Jul. 22, 2003 (DE) ................... 103 33 492
Dec. 23, 2003 (DE) ................... 103 61 481

(51) Int. Cl.
*F16F 9/32* (2006.01)
(52) U.S. Cl. ................................. 188/266.7
(58) Field of Classification Search ........... 188/266.7
See application file for complete search history.

(56) References Cited

U.S. PATENT DOCUMENTS
5,373,670 A * 12/1994 Sasaki et al. ............... 52/167.7

(Continued)

FOREIGN PATENT DOCUMENTS
DE    4142885 A1    7/1992

(Continued)

OTHER PUBLICATIONS

N.W. Hagood and A. von Flowtow; *Damping of Structural Vibrations with Piezoelectric Materials and Passive Electrical Networks*, Journal of Sound and Vibration, 146 (2), 243, (1991).

(Continued)

*Primary Examiner*—Robert A Siconolfi
*Assistant Examiner*—Anna Momper
(74) *Attorney, Agent, or Firm*—IPxLAW Group LLP; Claude A.S. Hamrick

(57) ABSTRACT

Interfaces for damping mechanical vibrations are used, for example, for damping vibrations in the automotive or aerospace industry. The interfaces have a base connection element (10), a load connection element (28) and a support element (14), with the support element (14) being connected to the base connection element (10) via a pretensioning device (12). A first energy converter system (16, 18) extends between engagement points (20, 22) on the base connection element (10) and engagement points (24, 26) on the load connection element (28). A second energy converter system (30, 32) extends between engagement points (34, 36) on the support element (14) and engagement points (38, 40) on the load connection element (28).

13 Claims, 12 Drawing Sheets

U.S. PATENT DOCUMENTS

| | | | |
|---|---|---|---|
| 5,660,255 A | | 8/1997 | Schubert et al. |
| 5,765,817 A | * | 6/1998 | Breitbach .................. 267/136 |
| 5,862,638 A | * | 1/1999 | Holland et al. ............. 52/167.8 |

FOREIGN PATENT DOCUMENTS

| | | |
|---|---|---|
| DE | 19925982 B4 | 12/2000 |
| EP | 0756103 B1 | 1/1997 |
| EP | 0545264 B1 | 9/1997 |
| EP | 0957288 A2 | 11/1999 |
| GB | 2222657 A | 3/1990 |
| JP | 61-286634 | 12/1986 |
| JP | 61-155347 | 7/1987 |

OTHER PUBLICATIONS

Mayer, D., et al., "Synthetische Induktivitaten fur semi-passive Dampfung," 5 Magdeburger Maschinenbautago, 2001, 10 pages.

* cited by examiner (PRIOR ART)

MODULAR INTERFACE FOR DAMPING MECHANICAL VIBRATIONS

BACKGROUND OF THE INVENTION

1. Field of the Invention

The invention relates to an interface for damping or isolating mechanical vibrations by means of a plurality of energy converter systems. Such interfaces are used, for example, for damping vibrations in the field of general machine engineering, the automotive industry, the construction industry or the aerospace industry.

Dynamic mechanical interference in the form of vibrations which are excited, for example, by the operation of assemblies (for example power supply assemblies) or by other ambient conditions, are produced in machines, vehicles and similar modules. The frequencies of these vibrations extend into the relatively high frequency acoustic range and bring about undesired dynamic and/or acoustic effects locally at the location where the interference is produced or applied, or further away after transmission over mechanical load paths. This results in losses of comfort, safety problems, damage to components owing to structural fatigue, shortened service life, reduced functionalities etc.

2. Description of the Related Art

What is referred to as material damping, in which the mechanical energy of the vibration is converted directly into thermal energy, is frequently used to damp or isolate mechanical vibrations. Examples of this are elastic or viscoelastic damping systems.

In addition, measures which are based on other energy converter systems are increasingly used. These energy converter systems generally convert mechanical energy into electrical energy and vice versa. Both effects are used to damp mechanical vibrations. The distinction is generally made here between active, semiactive and passive vibration dampers.

In the case of passive and semiactive vibration damping, the mechanical energy of the vibrations is firstly converted into electrical energy using an electric/mechanical energy converter (for example a piezoceramic). This electrical energy is then dissipated, i.e. converted into thermal energy, in a passive electrical circuit (e.g. an ohmic resistor) in the case of passive vibration damping, or diverted using an active electric circuit (for example electric damper) in the case of semiactive vibration damping. Such systems are described, for example, in N. W. Hagood and A. von Flotow: Damping of Structural Vibrations with Piezoelectric Materials and Passive Electrical Networks, Journal of Sound and Vibration 146 (2), 243 (1991).

In the case of active vibration isolation, at least one actuator system is connected between an interference source (base side) and a connection side. In this context, "actuator" refers to an energy converter which, for example, can convert electrical signals into mechanical movements, for example a piezoactuator or a pneumatic actuator. What is decisive is that the characteristic (for example extent) of the actuators can be varied in a controlled fashion by means of an actuation signal. An example of a system for active vibration isolation using actuator elements is disclosed in U.S. Pat. No. 5,660,255. Actuator elements and a small additional mass are interposed between a base housing and a useful load which is to be isolated. Sensors which record the displacement of the small mass are mounted on said small mass. An actuation signal for the actuator elements is generated from the displacement using an electronic closed-control circuit and an external electrical energy source. The actuator elements are actuated in such a way that the vibration movement at the location of the useful load is largely eliminated.

FIG. 1 shows a satellite as an example of active isolation of interference sources and sensitive components which should be protected from mechanical interference. The satellite contains internal interference sources 1, for example mechanical coolers, motors etc. Mechanical interference from these interference sources 1 is damped by active elements 2, 3, 4 so that the interference from the interference sources 1 does not act on the sensitive components 5 (cameras, reflectors, etc.) via transmission paths 3, 4.

In addition to the use for active, passive and semiactive vibration damping, the electric/mechanical energy converters can often simultaneously be used as actuating elements for mechanical positioning of a useful load. This may be done, for example, by virtue of the fact that an annular arrangement of a plurality of actuators is integrated into a vibration-damping interface which can bring about, for example, selective tilting of a structure with respect to a base. Such a system is disclosed, for example, in DE 195 27 514 C2.

For structural reasons, actuator systems are frequently operated in practice with a preload. This is frequently a mechanical preload in the form of compressive loading or tensile loading on the actuator system. For example in the case of piezoactuators in which extension beyond the length at rest (i.e. length of the actuator without voltage applied) would lead to mechanical damage to the actuator, operation without preloading is in practice inappropriate or not possible. However, the structural implementation of a device for exerting a preload presents problems, in particular in the case of the actuator or actuators whose extension direction extends parallel to the force (for example the force of the weight) exerted by the useful load, and has a frequently negative effect on the effectiveness of the actuator. U.S. Pat. No. 5,660,255 does not disclose a satisfactory solution to this problem.

DE 195 27 514 C2 discloses an interface for reducing vibrations in structural dynamic systems in which vibration insulation occurs between a structure-side component and a base-side component by means of a plurality of actuators which have a main direction. Pressure pretensioning on the actuators is ensured by anti-fatigue bolts between the base-side component and the structure-side component. However, such a rigid mechanical connection between the base-side component and the structure-side component has the disadvantage that as a result a bridge is provided via which vibrations can propagate from a base-side interference source to the structure-side component.

SUMMARY OF THE INVENTION

The object of the present invention is to disclose an interface for vibration reduction which transmits as little sound as possible and which can be used for active, semiactive and passive vibration isolation as well as for mechanically positioning a load.

This object is achieved by means of the invention having the features of the independent claim. Advantageous developments of the invention are characterized in the subclaims.

An interface for reducing mechanical vibrations is proposed which has a base connection element, a load connection element and at least one support element. In this context, at least a first energy converter system extends between at least one engagement point located on the base connection element and at least one engagement point located on the load connection element.

The energy converter system can be based on various physical principles depending on the application and requirements. In particular piezoactuators have proven to be particularly advantageous. However, actuators which are based on what are known as shape-memory alloys or other materials with a memory effect as well as magnetostrictive or electrostrictive actuators, pneumatic or hydraulic actuators, magnetorheological or electrorheological fluid actuators and damping elements can be advantageously used. Combinations of different energy converter systems are also possible, for example the combination (for example a series or parallel circuit) of a piezoactuator with a "conventional" damping system, for example a spring system or a rubber damper.

Spring systems or elastic materials can also be used in combination with piezoactuators in order to generate a preload on the piezoactuator or to increase an existing preload. Vibrations in different frequency ranges can also be compensated by combining different operative principles and energy converter systems, that is to say for example high-frequency vibrations due to active or passive damping by means of piezoactuators, low-frequency vibrations due to conventional damping elements (for example viscoelastic dampers).

At least one second energy converter system extends between at least one engagement point located on the support element and at least one engagement point located on the load connection element. The descriptions stated above relating to the first energy converter system apply appropriately for the selection and the composition of this second energy converter system.

The base connection element is connected to the at least one support element via at least one pretensioning device in such a way that the pretensioning device can exert a preload on the first energy converter system and on the second energy converter system. This preload may be, for example, mechanical compressive loading or tensile loading. It is optionally also possible to operate with a preload of zero, that is to say an operating mode in which force is not exerted on the energy converter systems. This preload (also the preload of zero) can also be combined, for example, with an initial electrical load. The pretensioning device may be elastic or inelastic. The preload can be exerted directly or indirectly on the energy converter systems, that is to say for example also indirectly by means of an additional spring system.

The load connection element is to have a part which is located in an intermediate space between the base connection element and the support element and a part which is located outside the intermediate space between the base connection element and the support element.

Intermediate space is to be understood here as not only a closed-off cavity but also any space between the base connection element and the load connection element.

This condition ensures the advantage that the load connection element is easily accessible for mounting a load. The vibration insulation is provided, for example, by means of the part located between the base connection element and the support element, as a result of which compressive pretensioning can be exerted on the energy converter systems. On the other hand, a load is mounted on that part of the load element located outside the intermediate space between the base connection element and the support element. Said part is then no longer restricted by the spatial dimensions of the intermediate space, that is to say may be configured as desired in terms of shape and size and as a result, for example, take into account specific requirements of the connection geometry of the load.

The base connection element and the load connection element may have, for example, a planar mounting face. This facilitates the installation of the interface in existing structures for isolating a vibration-sensitive load from one or more interference sources. Furthermore, in this way it is possible to easily connect a plurality of interfaces in series.

The described interface can be integrated into structures
as a bearing element,
as a modular transmission element and/or
as an actuation element.

The proposed arrangement is characterized in particular by the fact that the load connection element is generally connected to the support element or the base connection element only via the first and second energy converter systems. In this way, the number of sound bridges between base-side interference sources and a useful load is reduced to the technically necessary minimum.

Despite this reduction in the sound bridges, the rigid or flexible pretensioning device, which produces a connection between the base connection element and the support element, permits a defined setting of a pretensioning of the energy converter systems. This may be done, for example, by virtue of the fact that the pretensioning device used is an elastic element, anti-fatigue screws or similar elements with a variable length.

It is possible to use energy converter systems with a common preferred direction or with different preferred directions, the latter option having the purpose, for example, of isolating vibrations in different spatial directions. A separate support element and a separate pretensioning device is then advantageously used for each spatial direction. Preferably in each case at least one energy converter system which extends between the base connection element and the load connection element and at least one energy converter system which extends between the load connection element and the support element is used for each spatial direction. In turn, pretensioning can then be exerted on the energy converter systems without sound bridges being provided between the base element and the load connection element.

Furthermore, it is also possible to use more than two energy converter systems for one spatial direction. This may be advantageous in particular if the energy converter systems are actuator systems which are intended to bring about not only pure translation of the load connection element but also, for example, tilting. If, for example, two pairs of actuator systems are arranged in parallel, unequal extension of the two pairs leads to tilting of the load connection element about an axis perpendicular to the preferred direction of the two pairs of actuator systems. In analogous fashion it is possible to use a plurality of pairs of actuator systems to bring about tilting of the load connection element about a plurality of axes. In this way it is possible, for example, also to isolate torsional vibrations in the base connection element from the load connection element.

In a further advantageous refinement of the invention, the base connection element and the load connection element each have standardized connection geometries. These connection geometries may be, for example, threads, flanges, screwed bolts etc. This permits rapid and cost-effective exchange or supplementation of existing elements and structures by the described interface for reducing vibration. For example, in satellite engineering it is easily possible to connect the interface between the main body, which contains, for example, interference sources in the form of motors, and a position-sensitive antenna without structural changes being necessary to the entire arrangement. It is possible, for example, to resort to standardized flange geometries.

The pretensioning device advantageously has a pipe which surrounds the actuator systems. The pipe may have circular, rectangular or any desired cross-sectional geometry.

This is advantageous in particular if all the energy converter systems have a common preferred direction. The enclosed pipe may be of rigid or flexible design and is particular designed in such a way that the tubular axis is oriented approximately parallel to the preferred direction of the actuator systems. The pipe protects the actuator systems against environmental influences such as, for example, moisture, dirt or the like. Furthermore, the pipe stabilizes the energy convert systems against effects of forces perpendicular to the preferred direction (for example shearing forces) which could cause mechanical damage to the energy converter systems.

In different methods for damping vibrations it is advantageous to generate information about the actual vibration of the load connection element. For this reason, a sensor system for determining, for example, travel, velocity, acceleration or force can be connected or intermediately connected to an element of the interface. In particular it is advantageous if a sensor is connected to the load connection element. Further sensors systems may be connected, for example, to the base connection element.

The sensor systems may be, for example, capacitive or piezoelectric acceleration or force sensors or magnetic, electrostatic or interferometric position or velocity sensors.

The information of the at least one sensor system may be used, for example, for active vibration damping. In this context, actuator systems may be used in particular as energy converter systems. The signals of the sensor system are made available to an electronic closed loop control system. The electronic closed loop control system generates control signals (target function) from the sensor signals, said control signals being converted into actuation signals for the actuator systems by means of a power supply. These actuation signals are used to excite the actuator systems to vibrate, said vibrations being, for example, in antiphase with respect to the vibrations to be isolated and eliminating or damping said vibrations at the location of the load.

In one development of the invention, at least one energy converter system is embodied entirely or partially as an actuator system. In this context, part of this actuator system will be in turn capable of being used at the same time as an energy converter which can convert mechanical energy into electrical energy.

In this development, both energy conversion directions are therefore used simultaneously. Whereas electrical energy is typically converted into mechanical energy in an actuator, in this embodiment of the invention mechanical energy is converted simultaneously into electrical energy at least in part of an actuator. Actuators which are capable of carrying out this reversal of the converter principle are also referred to as multifunctional converter systems. The materials used in this context, which can simultaneously bear mechanical loads and act as an actuator or sensor (see below) are referred to as multifunctional materials.

The conversion can be carried out, for example, by utilizing the piezoelectrical effect, for example by means of a piezoceramic. In this context, a pressure on a piezoceramic or fluctuations in pressure in a piezoceramic are converted into electrical signals. Since piezoactuators are frequently composed of stacks of a large number of piezoceramic layers, it is possible, for example, to use a layer from this stack simultaneously for converting mechanical energy into electrical energy.

This development has various advantages. On the one hand, it is possible to dispense at least partially with the use of additional sensors. The electrical signals which are generated by the actuator system serve simultaneously as sensor signals and can contain, for example information about the acceleration or velocity of the movement of a useful load.

In this way it is possible to determine the system response of the entire system to interference, for example by means of the interface. For example the actuator systems of the interface can have a specific reference structure stimulation applied to them. This reference structure stimulation brings about a structure response by the entire system in the form of mechanical vibrations. By recording the electrical signal of an actuator which acts as an energy converter between mechanical energy and electrical energy it is possible to record the structure response by means of measuring equipment. The measured structure response, e.g. of the transmission properties, between the actuator-induced reference stimulation and sensor or the determination of impedance permits conclusions to be drawn about the current structural state of the entire system, for example by comparing the measured structure response or determining structure characteristic values with reference structure responses or reference structure characteristic values stored in a database.

A further advantage of the simultaneous use of at least part of an actuator system as a mechanical/electrical energy converter is the possibility of using it as a passive or semiactive vibration damper. In this context, an electronic circuit is used to dissipate the electrical energy.

In the simplest case, this electronic circuit is composed of ohmic resistor in which the electrical energy is converted partially into heat. Even more efficient vibration damping can be achieved by additionally using one or more coils and/or one or more capacitors. For example, the mechanical vibrations of the interface can thus result in periodic fluctuations in the charges on the surfaces of a piezoceramic of a piezoactuator of the interface. This corresponds to periodically fluctuating charges on the plates of a capacitor. If the two plates of the capacitor (that is to say the two surfaces of the piezoceramic) are connected to one another by means, for example, of an ohmic resistor and a coil, the mode of operation of the arrangement corresponds to the effect of a damped electrical oscillatory circuit.

A further increase in the efficiency of the vibration damping can be achieved by using what is referred to as a "synthetic inductor" instead of at least one coil. This synthetic inductor is generally composed of a combination of a plurality of ohmic resistors with one or more operational amplifiers. In this way it is possible to achieve higher inductances than with conventional coils. As a result, the damping of the oscillatory circuit is increased further. This technology is described, for example, in D. Mayer, Ch. Linz and V., Krajenski: Synthetic Inductors for Semipassive Damping, 5. Magdeburger Maschinenbautage, 2001.

The efficiency of the vibration damping can be further increased by connecting in series a plurality of the interfaces described above in one of the described configurations and wiring arrangements in cascades. In this context, in each case the base connection element of the following interface is connected to the load connection element of the preceding interface.

BRIEF DESCRIPTION OF THE DRAWING FIGURES

In the text which follows the invention will be explained in more detail with reference to exemplary embodiments which are illustrated schematically in the figures. However, it is not restricted to the examples. Identical reference numbers in the individual figures relate to elements which are identical or functionally identical or which correspond to one another in terms of their functions. In particular:

DETAILED DESCRIPTION OF THE INVENTION

Figure 1:
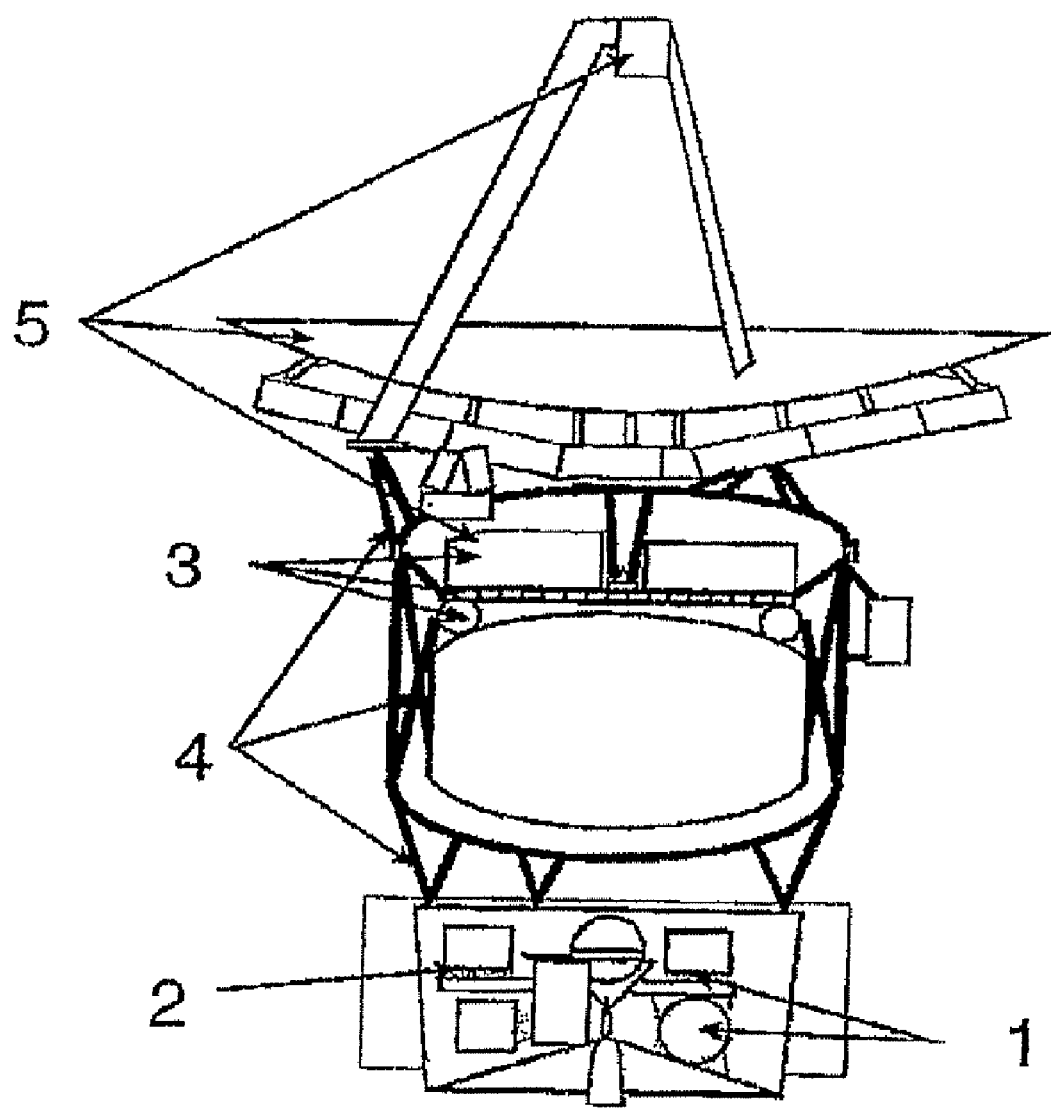
FIG. 1 shows a satellite with active isolation of interference sources and sensitive components in accordance with the prior art.
Figure 2:
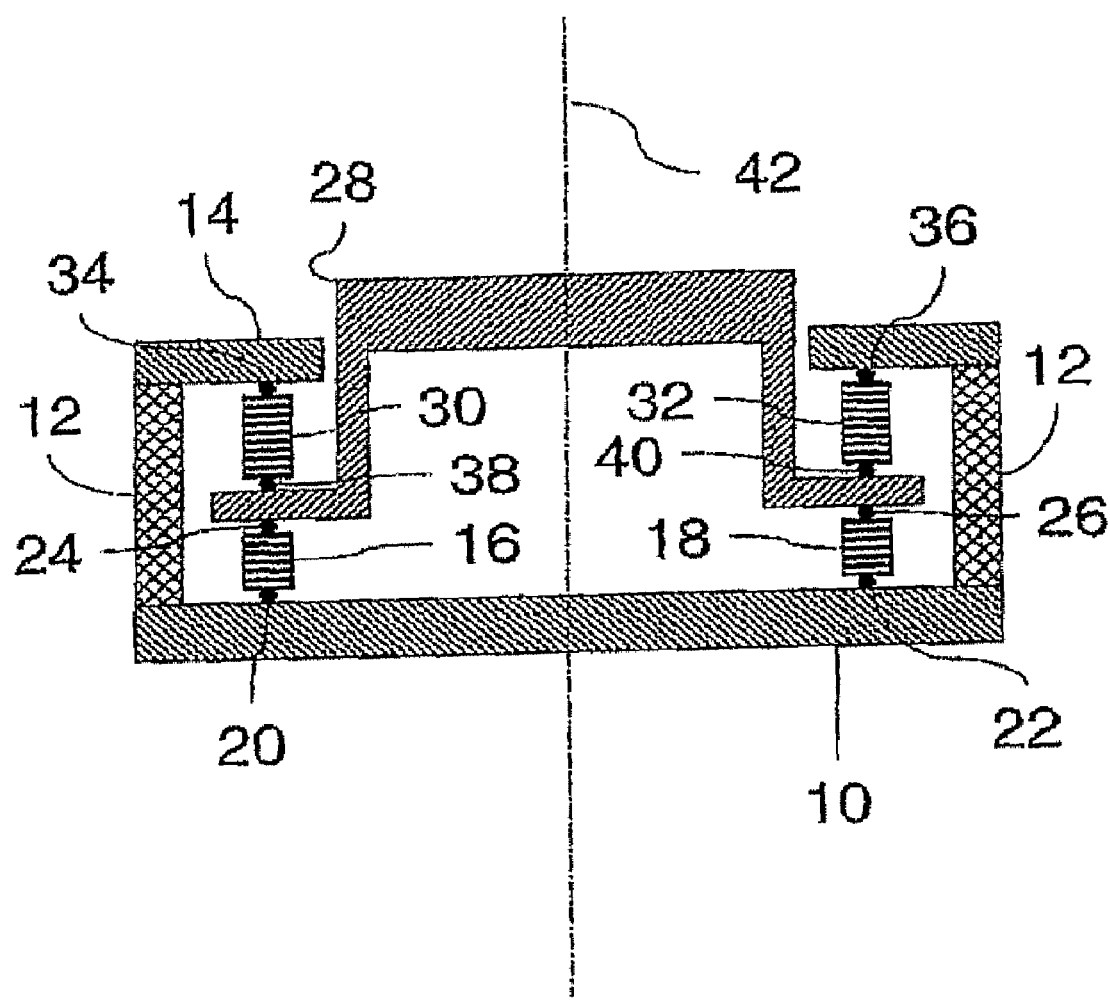
FIG. 2 shows a structural mechanical interface for vibration damping.

FIG. 2 illustrates a preferred embodiment of the described interface for vibration damping. A base connection element 10 is connected to a support element 14 via a pretensioning device 12. A first energy converter system, which is composed of the piezoactuators 16 and 18, extends between the engagement points 20 and 22 on the base connection element 10 and the engagement points 24 and 26 on the load connection element 28. A second energy converter system which is composed of the piezoactuators 30 and 32 extends between the engagement point 34s and 36 on the support element 14 and the engagement points 38 and 40 on the load connection element 28.

The illustrated arrangement shows merely a cross section through the structural mechanical interface. The arrangement of this example is symmetrical with the indicated axis 42 of symmetry, with the exception of the piezoactuators 16, 30, 18, 32. The base connection element 10 is therefore a circular disk and the support element 14 an annular disk. The load connection element 28 is in the shape of a cylindrical cap, with part of the load connection element being located in the intermediate space between the pretensioning device 14 and the base connection element 10 and part being located outside. The pretensioning device 12 is composed of an elastic pipe with a diameter which is identical to the external diameter of the circular disk of the base connection element 10 and to the external diameter of the annular disk of the support element 14. The pretensioning is carried out by virtue of the fact that the length of the elastic pipe is selected such that the pipe is expanded in the state of rest of the arrangement. As a result compressive pretensioning is exerted simultaneously on all the piezoactuators.

Instead of the illustrated four piezoactuators it is also possible to use more than four actuators. These piezoactuators are preferably arranged in a rotationally symmetrical fashion with respect to the axis 42 of symmetry.

The base connection element 10 and the load connection element 28 are configured in such a way that simple and rapid mounting of the interface between a base side which is excited to oscillate by interference sources 1 and a load which is to be isolated can take place. For this purpose, the base connection element 10 and the load connection element 28 are provided with threaded bores with standard dimensions.

If the piezoactuators 16 and 18 are lengthened by simultaneous electric actuations and the piezoactuators 30 and 32 are shortened to the same degree by suitable electrical actuations, the distance between the load connection element 28 and base connection element 10 is increased. Correspondingly, shortening the piezoactuators 16 and 18 and simultaneously lengthening the piezoactuators 30 and 32 reduces the distance between the load connection element 28 and base connection plate 10. The electric actuations of the piezoactuators are not illustrated in FIG. 2.

If the piezoactuators 16 and 30 and 18 and 32 are each in antiphase, for example actuated with sinusoidal alternating voltage of suitable amplitude and frequency, the load connection element 28 swings up and down in relation to the base connection element 10. This can be used, for example, for active vibration damping.

Figure 3:
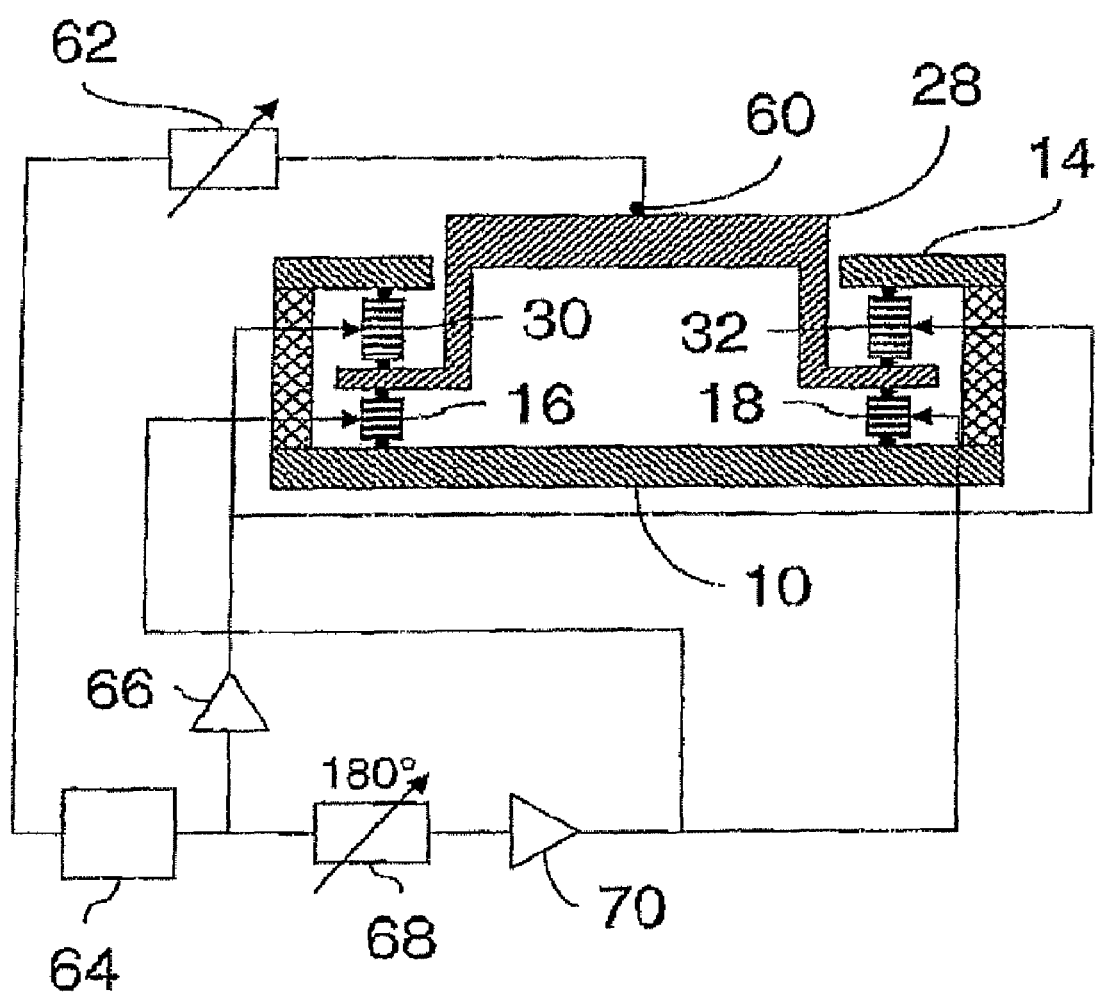
FIG. 3 shows a simplified electrical wiring arrangement for active vibration damping of the interface illustrated in FIG. 2.

FIG. 3 illustrates an electric wiring system for the interface according to FIG. 2. An acceleration sensor 60 which is secured to the load connection element 28 is connected to the input of an electronic closed loop control system 64 via a phase shifter 62. An output of the electronic closed loop control system 64 is connected to the piezoactuators 30 and 32 via a post-amplifier 66. Furthermore, the output of the electronic closed loop control system 64 is connected to the piezoactuators 16 and 18 via a 180.degree. phase shifter 68 and a second postamplifier 70.

If vibrations of the base connection element 10 are to be isolated from the load connection element 28, these vibrations are detected using the acceleration sensor 60. The sensor signal is then converted into suitable antiphase actuation signals for the piezoactuators 16 and 30 and 18 and 32 using the electronic closed loop control systems 64 and the first phase shifter 62. The first phase shifter 62 can serve, for example, for compensating phase shifts between the actual movement of the load connection element 28 and the sensor signals. This necessity depends, inter alia, on the method of operation of the sensor 60. For example in the case of sinusoidal vibrations in which a phase shift of 90.degree. occurs between the acceleration and velocity and between the velocity and position, the signal of a velocity sensor would have to be phase shifted by 90.degree. in order to be able to bring about a suitable change in length of the piezoactuators. Delays in the electronic closed loop control system 64 and resulting phase shifts can also be compensated by the phase shifter 62.

The signals generated in the electronic closed loop control system 64 are amplified further in the postamplifiers 66 and 70 and fed to the actuators 30 and 32 and 16 and 18. The second phase shifter 68 is necessary since the two actuator systems 16, 18 and 30, 32 generally have to be actuated in antiphase.

The piezoactuators 16 and 30 and 18 and 32 are each excited to undergo antiphase vibrations by which the vibrations are transmitted to the load connection element 28. In the load connection element 28 the vibrations excited by the piezoactuators are superimposed on the vibrations of the basic connection elements 10 in a destructive fashion if the phase is selected suitably so that the vibrations of the load connection element 28 are damped.

In the illustrated arrangement, the piezoactuators 16, 18 of the first actuator system and the piezoactuators 30, 32 of the second actuator system are each configured in the same way, i.e. identical actuation signals bring about identical changes in length. For this reason, in each case a single postamplifier 66 or 70 can be used for the actuators of an actuator system. If different actuators are used within an actuator system, different postamplifiers would have to be used for each of the actuators.

The actuation of the piezoactuators is illustrated in a highly simplified form. As a rule, each piezoactuator has two electrical terminals to which different voltages have to be applied. The difference in voltage between the electric terminals determines the extension of the length of the piezoactuator.

Figure 4:
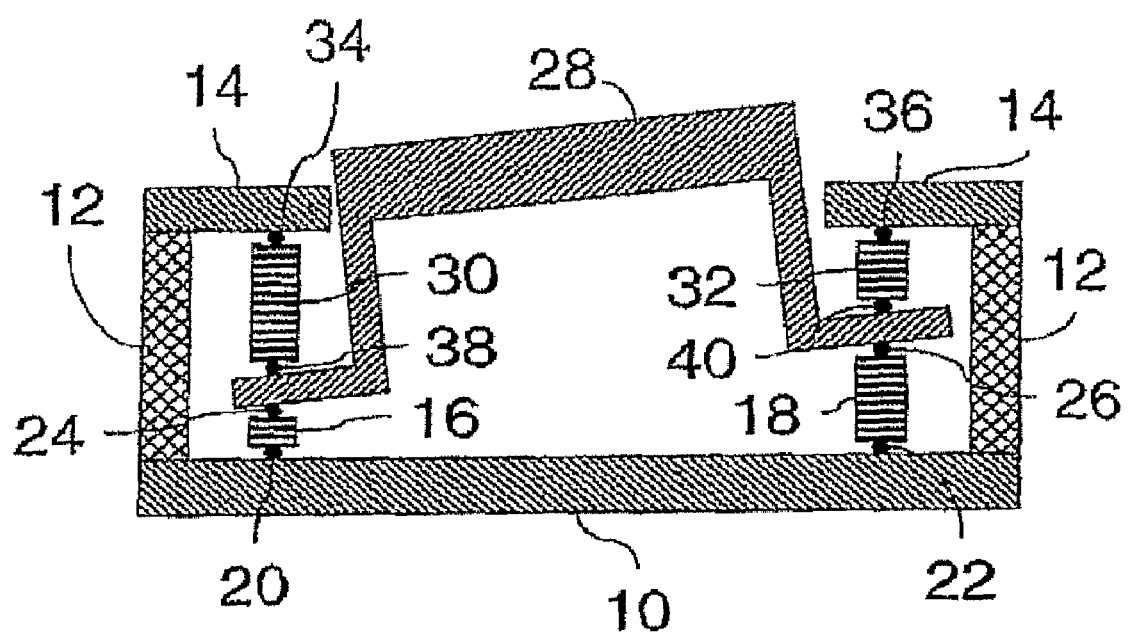
FIG. 4 shows a means of actuating the actuator systems of the interface in FIG. 2 for the selective tilting of a useful load.

FIG. 4 illustrates how tilting oscillations of the base connection element 10 can also be compensated or damped by selective actuation of the piezoactuators of the arrangement in FIG. 2. By virtue of the fact that the piezoactuator 30 is set, by a suitable electric actuation signal, to a greater length than the piezoactuator 32, and the piezoactuator 16 is correspondingly set to a smaller length than the piezoactuator 18, the load connection element 28 is tilted relative to the plane of the base connection element 10. For this purpose, the piezoactuators 16, 18, 30, 32 require individual electric actuation means (not shown).

If tilting vibrations occur in the base connection element 10, they can be detected, for example, by comparing the signals of different sensors which are mounted at different locations on the surface of the load connection element 28. The signals are then converted into suitable actuation signals of the piezoactuators using an electronic closed loop control system 64 So that the load connection element 28 carries out a tilting vibration relative to the base connection element 10, and said tilting oscillation is superimposed in a destructive fashion on the tilting oscillation of the base connection element 10 and thus damps it in the load connection element 28.

The electronic closed loop control system 64 can, for example, be constructed in such a way that a sum signal and a difference signal are formed from the signals of two sensors which are secured to the load connection element 28 and said sum signal and difference signal are converted in separate controllers to form actuation signals for the piezoactuators. The actuation signal for each piezoactuator is then a superimposition of signals from the two controllers.

Figure 5:
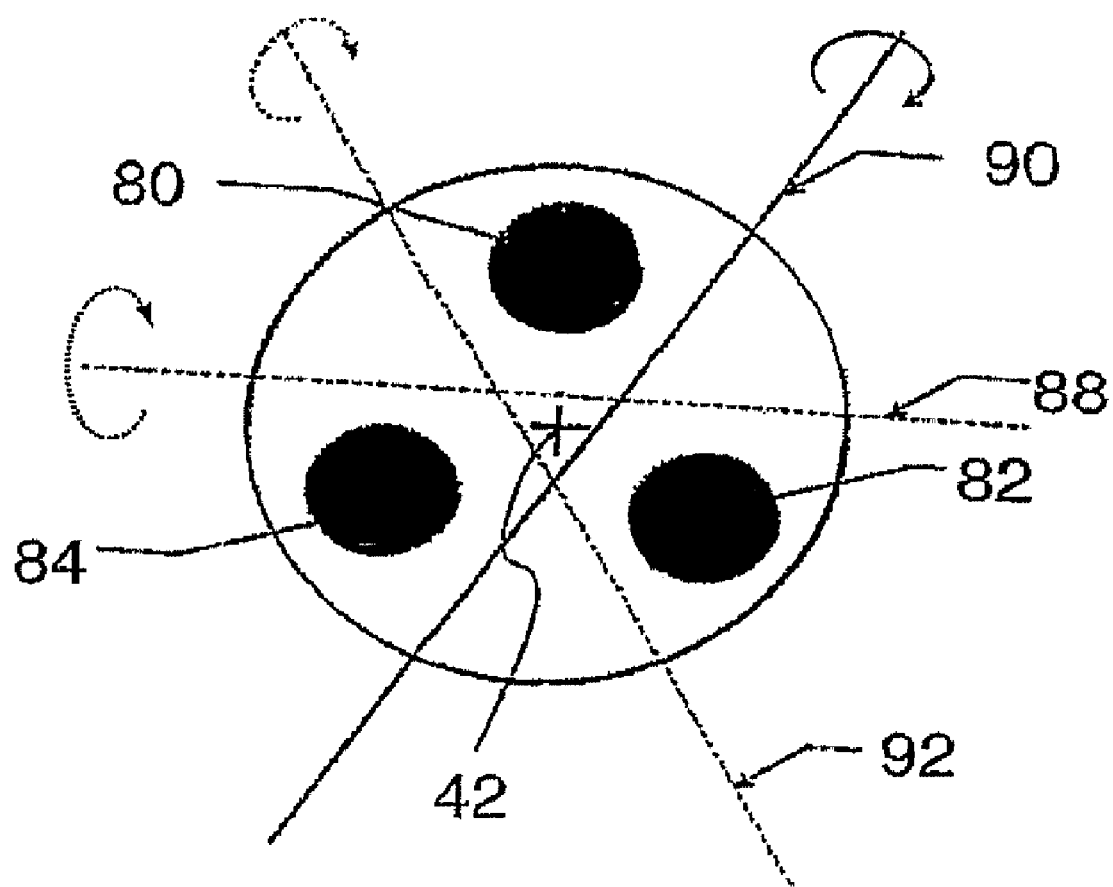
FIG. 5 shows the possible tilting axes for an interface with actuators which are arranged with 120.degree. rotational symmetry.

In this exemplary embodiment in which only two actuator pairs 16 and 30 and 18 and 32 are used, the load connection 28 can only be tilted about an axis perpendicular to the axis 42 of symmetry. If, as described above, more actuator pairs are used, tilting about a plurality of axes perpendicular to the axis 42 of symmetry is possible. FIG. 5 illustrates in sketch form in a plan view an interface with three actuator pairs 80, 82, 84 as an example. Only the actuator pairs 80, 82, 84 and the tilting axes are illustrated. Each of the actuator pairs 80, 82 and 84 is respectively composed of an actuator which extends between an engagement point on the base connection element 10 and an engagement point on the load connection element 28, and an actuator which extends between an engagement point on the support element 14 and an engagement point on the load connection element 28. The actuators of, in each case, one actuator pair are arranged linearly and perpendicularly with respect to the plane of the drawing in this embodiment and therefore cannot be seen individually. The actuator pairs 80, 82, 84 are arranged in a rotationally symmetrical fashion through 120.degree. about the axis 42 of symmetry which is perpendicular to the plane of the drawing.

The arrangement allows the load connection element 28 to tilt about the three tilting axes 88, 90 and 92 which are each arranged perpendicularly to the axis 42 of symmetry.

The invention provides the advantage that in addition to tilting vibrations about various axes it is also possible to damp torsional vibrations of the base connection element 10. This can be done, for example, by cyclically actuating the actuator pairs 80, 82 and 84.

Figure 6:
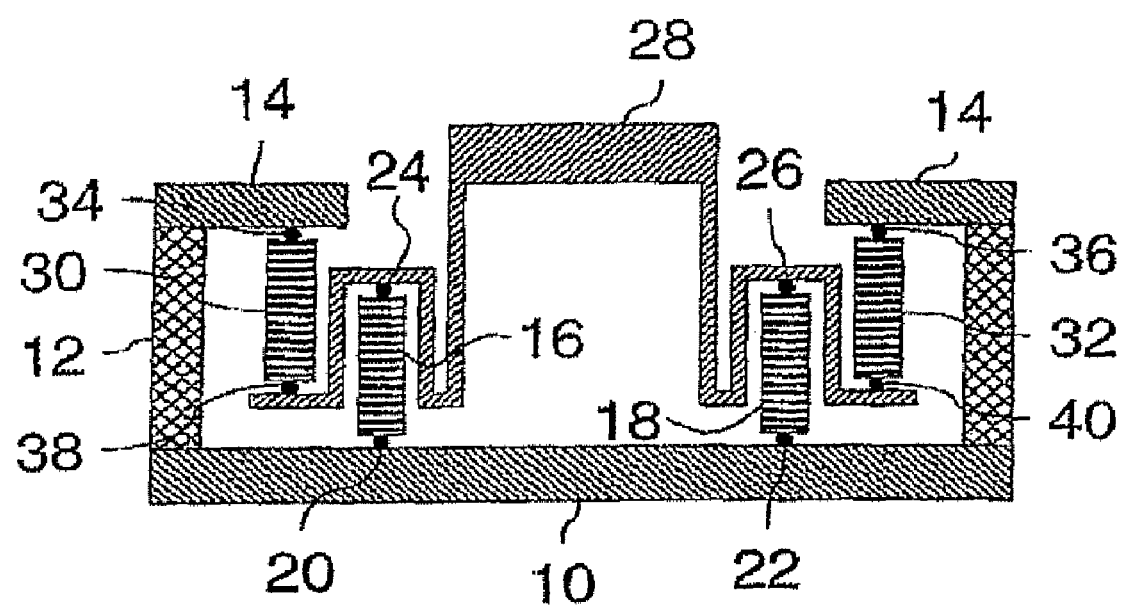
FIG. 6 shows an alternative embodiment of a structural mechanical interface for vibration damping.

FIG. 6 illustrates an example which shows that the engagement points of one of the actuators of an actuator pair do not need to be arranged in a line. The load connection element 28 is embodied in this design in such a way that the sum of the distances between the engagement points 34 and 36 and 38 and 40 and the distances between the engagement points 24 and 26 and 20 and 22 is greater than the distance between the base connection element 10 and the support element 14. In other words, the load connection element 28 can be configured in such a way that the sum of the lengths of an actuator pair 16, 30 and 18, 32 does not need to correspond to the distance between the base connection element 10 and support element 14. Configurations in which the length of an individual actuator exceeds the distance between the base connection element 10 and support element 14 are also possible.

As a result, it is possible to make use of the different lengths of actuators without the external design, which is determined essentially by the distance between the base connection element 10 and support element 14, having to be significantly changed. Since the maximum change in length of a piezoactuator depends on the overall length of the piezo, it is thus possible to lengthen the actuation path of the interface by using relatively long piezoactuators. Furthermore, by using different piezoactuators it is possible to damp vibrations with different vibration frequencies since the resonant frequency of the piezoactuators also depends significantly on the overall length of the piezoceramic.

Figure 7:
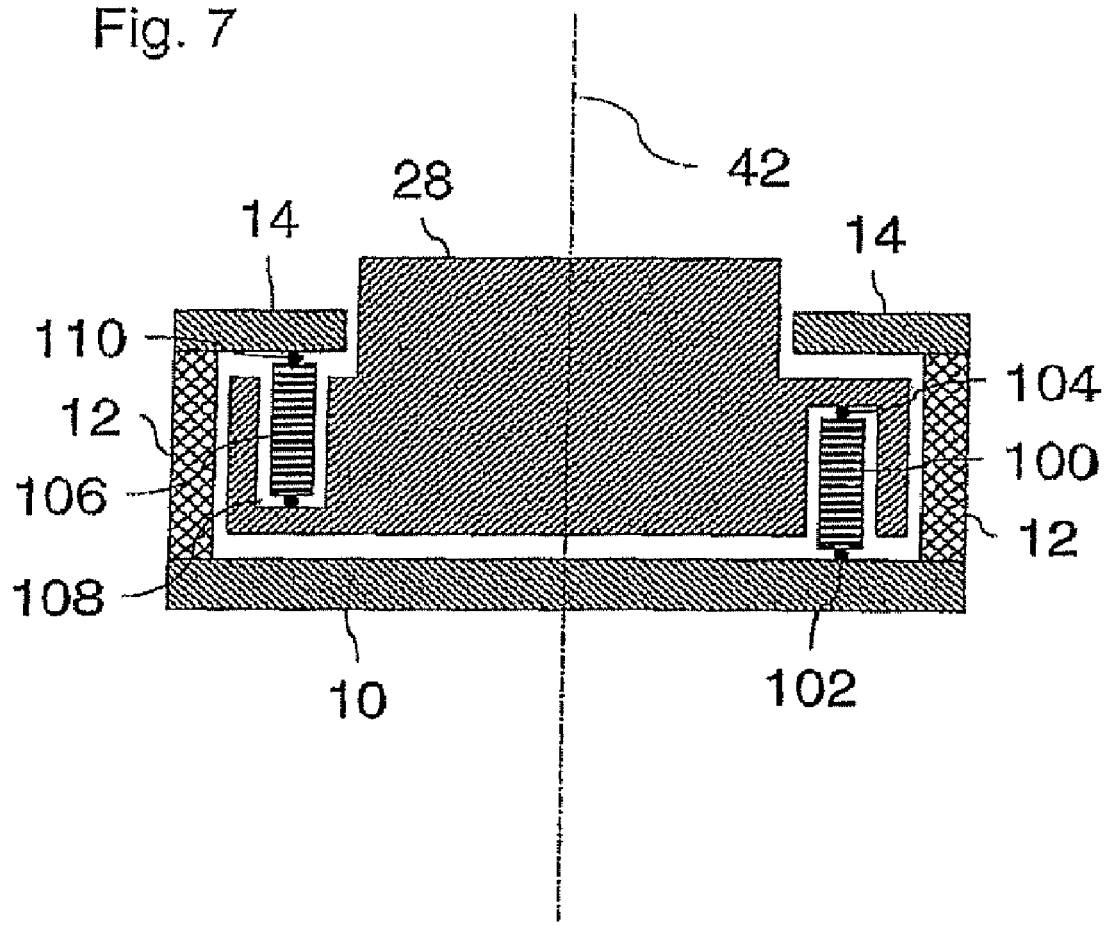
FIG. 7 shows a further alternative embodiment of a structural mechanical interface for vibration damping.

FIG. 7 illustrates an exemplary embodiment which shows that the actuators 100 which extend between the engagement points on the base connection element 10 and the load connection element 28 and the actuators 106 which extend between the engagement points on the support element 14 and on the load connection element 28 do not need to be arranged on the same side of the axis 42 of symmetry. A piezoactuator 100 extends between an engagement point 102 on the base connection element 10 and an engagement point 104 on the load connection element 28. A further piezoactuator 106 extends between an engagement point 108 on the load connection element 28 and an engagement point 110 on the support element 14.

In many cases, the actuators are arranged in such a way that overall the torques which are exerted on the load connection element 28 cancel one another out. This ensures that all the actuators are always subjected to pressure pretensioning. In the arrangement illustrated in FIG. 7, this can occur, for example, by further piezoactuators (not illustrated in this sectional view) being adjacent to the piezoactuator 106, said further piezoactuators extending between engagement points on the base connection element 10 and engagement points on the load connection element 28 and thus compensating the torque which is exerted on the load connection element 28 by the piezoactuator 106. For example, the arrangement can have six piezoactuators which are rotationally symmetrical through 120.degree. Said piezoactuators are arranged in such a way that in each case one actuator of the first actuator system (i.e. extending between engagement points on the base connection element 10 and the load connection element 28) and one actuator of the second actuator system (i.e. extending between engagement points on the support element 14 and the load connection element 28) lie opposite one another relative to the axis 42 of symmetry. Adjacent actuators are associated with different actuator systems.

Figure 8:
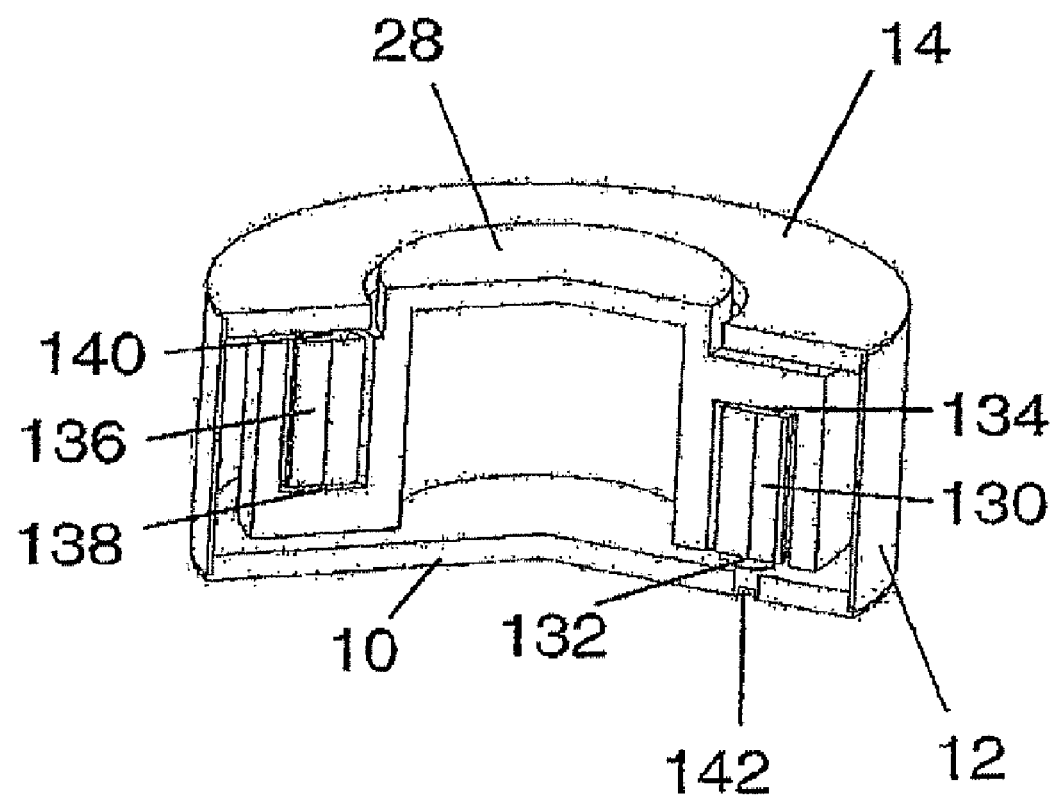
FIG. 8 shows a structural mechanical interface for vibration damping in a perspective partial illustration with a cut-out segment.

FIG. 8 illustrates an interface for vibration damping in a perspective partial illustration with a cut-out segment. A piezoactuator 130 extends between an engagement point 132 on the base connection element 10 and an engagement point 134 on the load connection element 28. A further piezoactuator 136 extends between an engagement point 138 on the load connection element 28 and an engagement point 140 on the support element 14.

In this illustration it is apparent that both the base connection element 10 and the surface of the load connection element 28 are freely accessible for mounting purposes. The pretensioning device 12 is embodied as an elastic, cylindrical pipe which completely encloses the actuator systems and thus protects them against undesired loading by shearing forces perpendicular to their preferred direction and against environmental effects. The electrical feedlines to the piezoactuators can be routed to the piezoactuators 130 and 136 through an opening 142 in the base connection element 10, for example.

Figure 9:
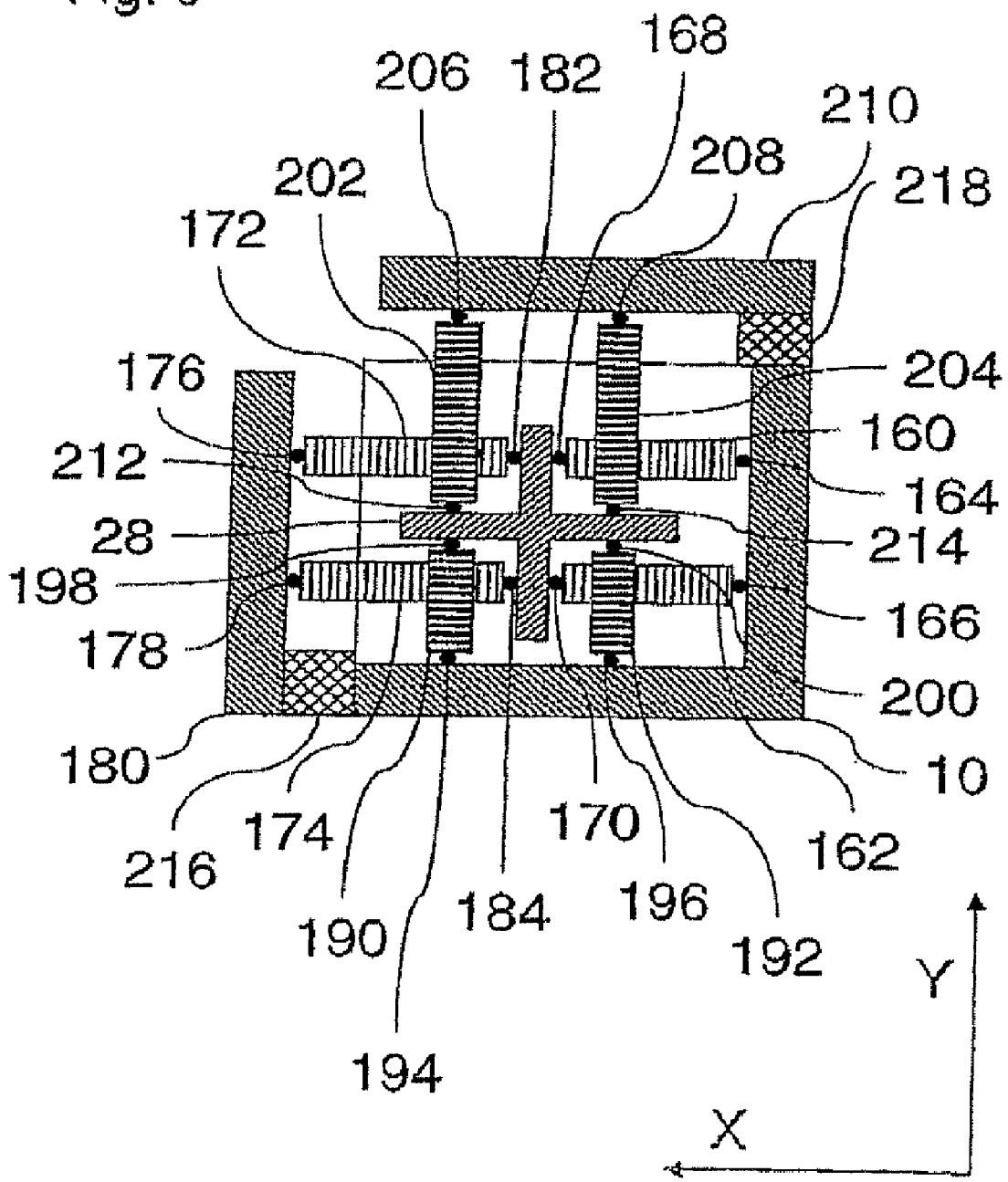
FIG. 9 shows a structural mechanical interface for vibration damping in two spatial directions which are perpendicular to one another.

FIG. 9 illustrates a plan view of an arrangement which shows the use of the invention for vibration damping in various spatial directions. An actuator system which is composed of the piezoactuators 160 and 162 extends between the engagement points 164 and 166 on the base connection element 10 and the engagement points 168 and 170 on the load connection element 28. An actuator system which is composed of piezoactuators 172 and 174 extends between the engagement points 176 and 178 on a first support element 180 and the engagement points 182 and 184 on the load connection element 28. The actuators 160, 162, 172 and 174 have the same spatial direction (referred to below as the X direction) as the preferred direction.

An actuator system which is composed of the piezoactuators 190 and 192 extends between the engagement points 194 and 196 on the base connection element 10 and the engagement points 198 and 200 on the load connection element 28. An actuator system which is composed of the piezoactuators 202 and 204 extends between the engagement points 206 and 208 on a second support element 210 and the engagement points 212 and 214 on the load connection element 28. The actuators 190, 192, 202 and 204 have the same spatial direction (referred to below as the Y direction) as the preferred direction, with this spatial direction being perpendicular to the abovementioned preferred direction of the actuators 160, 162, 172 and 174.

In this exemplary embodiment, the support element 14 is composed of two separate support elements 180 and 210. They are each connected to the base connection element 10 with a pretensioning device 216 or 218 (for example a rubber cube).

The load can be mounted on the load connection element 28 having, in this example, a cross-shaped cross section, by virtue of the fact that the load connection element additionally has a planar mounting plate which is mounted on the cross of the load connection element.

The arrangement has various advantages. On the one hand, transverse vibrations of the base connection element 10 in the X and Y directions can be damped by suitably actuating the piezoactuators. In this context it is possible, for example, to use, for each spatial direction, an electronic circuit for active vibration damping in a way which is analogous to the circuit described in FIG. 3. In addition, tilting vibrations of the base connection element 10 toward the X axis or Y axis can also be compensated by suitable actuation of the piezoactuators in a way which is analogous to FIG. 4.

The piezoactuators are pretensioned differently in the two spatial directions by the pretensioning devices 216 and 218. This may be advantageous for applications in which different types of piezoactuators are to be used in the X and Y directions owing, for example, to different vibrations being expected in these two spatial directions.

In addition to the actuators which are illustrated here in the X and Y directions, it is also possible to use additional actuators in an analogous fashion in the spatial direction which is perpendicular to the X and Y directions. A separate support element is also appropriate for this again. This support element is preferably embodied again in such a way that the load connection element 28 is freely accessible for mounting purposes.

Figure 10:
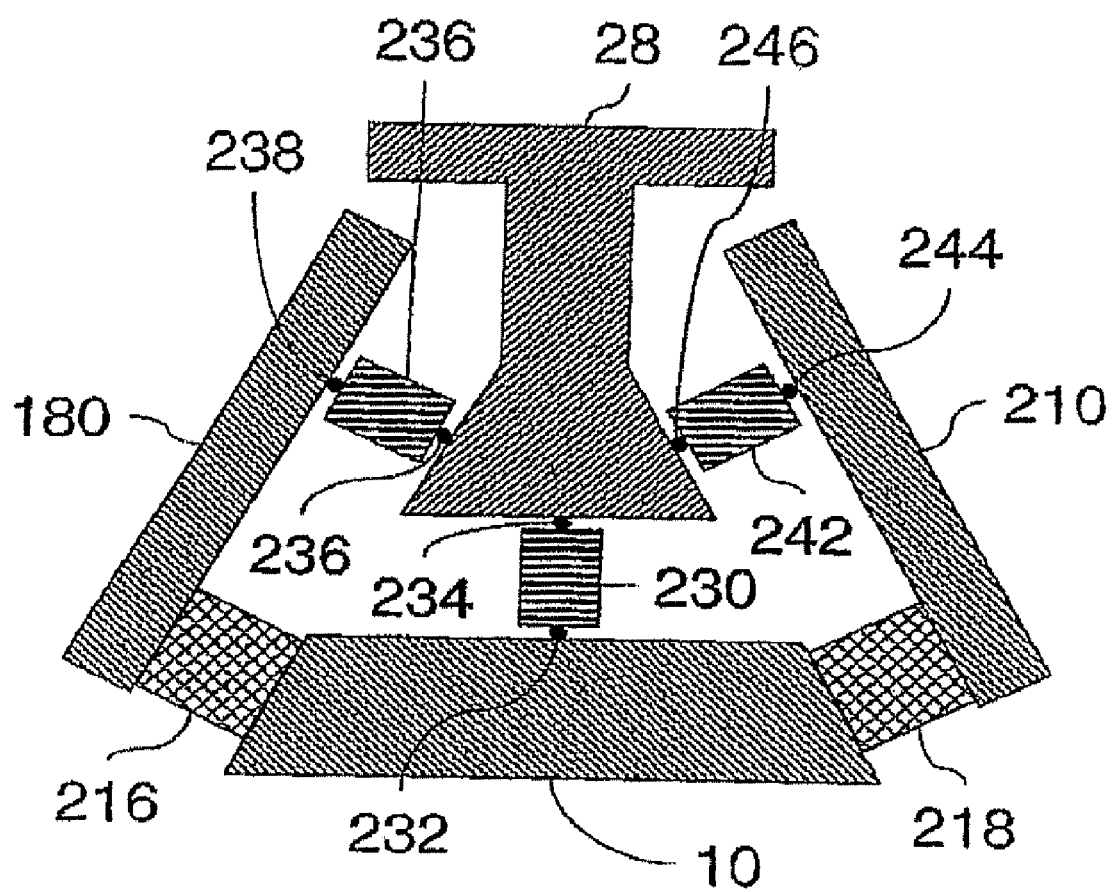
FIG. 10 shows a structural mechanical interface for vibration damping in three spatial directions which are not perpendicular to one another.

FIG. 10 illustrates an arrangement for vibration damping in various spatial directions which is an alternative to FIG. 9. The arrangement has, like the arrangement in FIG. 9, in turn a base connection element 10 and two support elements 180 and 210 which are connected to the base connection element 10 via the pretensioning devices 216 and 218. A first piezoactuator 230 extends between an engagement point 232 on the base connection element 10 and an engagement point 234 on the load connection element 28. A second piezoactuator 236 extends between an engagement point 238 on the support element 180 and an engagement point 240 on the load connection element 28. A third piezoactuator 242 extends between an engagement point 244 on the support element 210 and an engagement point 246 on the load connection element 28.

The arrangement shows that it is not absolutely necessary for in each case an actuator which extends between the base connection element 10 and the load connection element 28 and an actuator which extends between a support element and the load connection element 28 to have the same preferred direction.

As an alternative to the arrangement illustrated in FIG. 10 it is also possible to use further piezoactuators for damping vibrations in further spatial directions. Thus, for example four piezoactuators and three support elements could be arranged in such a way that the piezoactuators each point into the corners of a tetrahedron which is standing on one of its tips.

Figure 11:
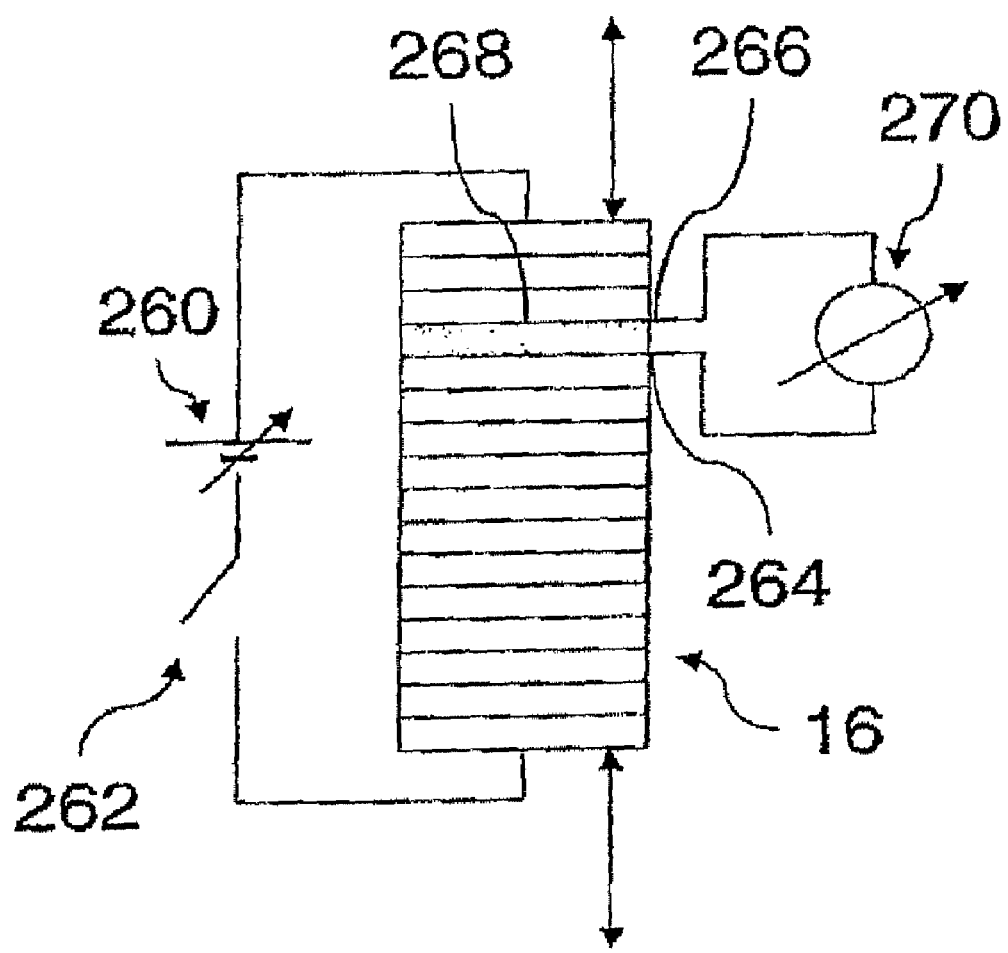
FIG. 11 shows an arrangement for the partial use of a piezoactuator of a structural mechanical interface as a sensor for a structural analysis.

FIG. 11 illustrates how a piezoactuator can be used as a sensor for a structural analysis. Said figure is a detailed view of any piezoactuator from one of the abovementioned exemplary embodiments, that is to say for example the piezoactuator 16 in FIG. 2. The piezoactuator is composed in this example of a stack of a plurality of piezoceramic elements.

A specific voltage is applied to the piezoactuator 16 by means of a variable voltage source 260, with the switch 262 being initially closed. If the switch 262 is then suddenly opened, the length of the piezoactuator 16 changes suddenly. The entire system, that is to say also the other elements which are not illustrated here such as, for example, the load connection element 28, starts to vibrate. This is referred to as the structural response of the entire system to the stimulation by opening the switch 262.

The vibrations of the entire system in turn bring about a periodically changing pressure on the piezoactuator 16. Owing to the piezo effect, these pressure fluctuations result in fluctuations in the electrical voltage between the electrodes 264 and 266 of a piezoceramic element 268 of the piezoactuator 16. These voltage fluctuations can be registered and recorded using a measuring device 270.

Instead of simply switching off the voltage which is applied to the piezoactuator 16 it is also possible to stimulate the entire system by means of other voltage profiles. For example, a simple sinusoidal voltage can be used or a voltage pulse. The respective structural response of the entire system to various types of stimulations can be used for a system analysis of the entire system by comparison with simulation values or by comparison with reference structural responses. If, for example, the structure interface is integrated into a carrier arm of a satellite system or into a spring-damper system in the region of the chassis of a motor vehicle, for example defects (for example due to material fatigue, etc.) can be detected and suitable countermeasures taken early by means of regular structural analyses.

Furthermore, the piezoceramic element 268 which acts as a sensor in FIG. 11 can also be used for active vibration damping according to FIG. 3. Instead of the signal of the acceleration sensor 60 in FIG. 3, the voltage which occurs between the electrodes 264 and 266 (after suitable phase shifting in the phase shifter 62) is then used as an input signal for the electronic closed loop control system 64. In this way it is possible to dispense with additionally providing a sensor in the interface.

Figure 12:
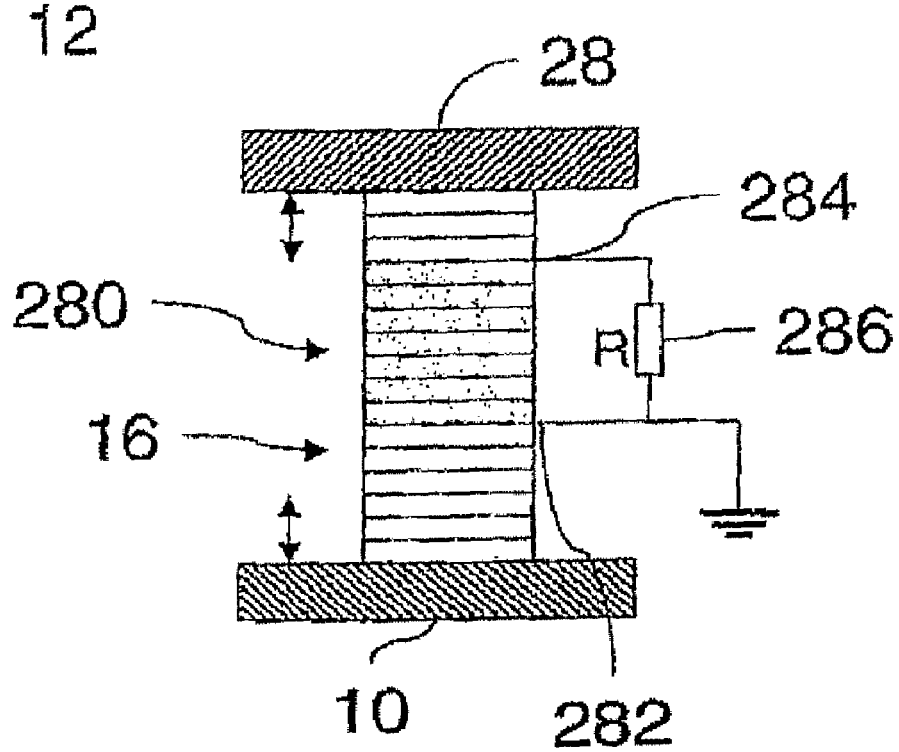
FIG. 12 shows an electrical wiring system of part of a piezoactuator of a structural mechanical interface for passive vibration damping.
Figure 13:
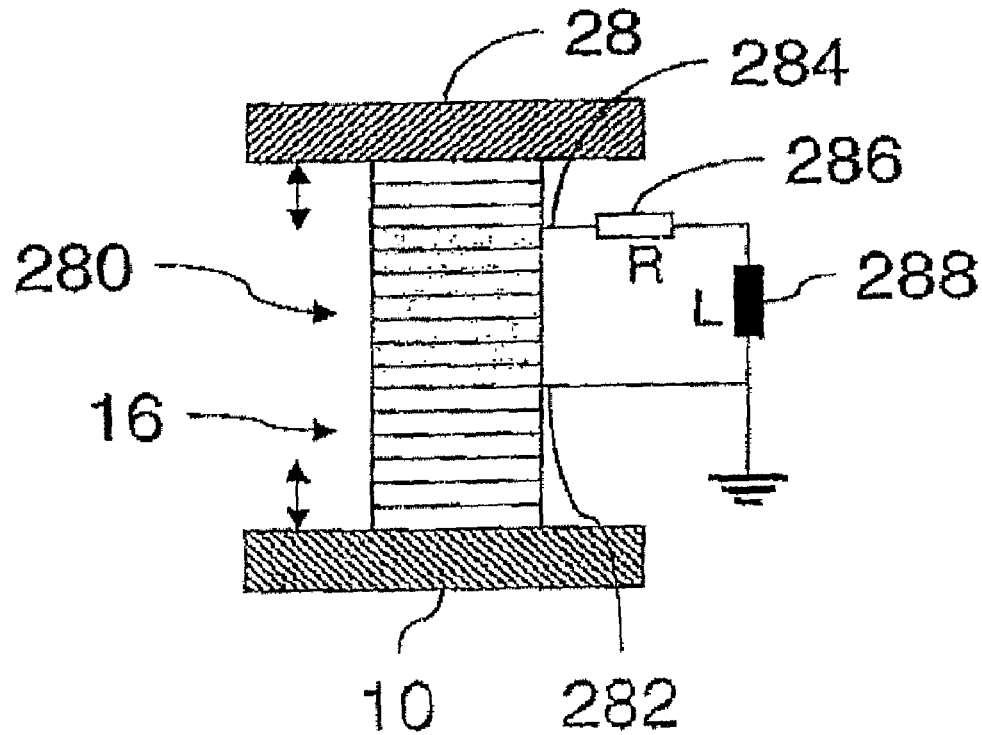
FIG. 13 shows an electrical wiring system of part of a piezoactuator of a structural mechanical interface for passive vibration damping which is an alternative to FIG. 12.

FIGS. 12 and 13 show possible wiring arrangements of the energy converters for vibration damping. These are again any piezoactuator of the interface, and a plurality of actuators can also be wired simultaneously in this way or a similar way. In the text which follows it is assumed that the actuator is the actuator 16 which extends between the base connection element 10 and the load connection element 28. The base connection element 10 and the load connection element 28 are illustrated in highly simplified form and the engagement points 20 and 24 and the other components of the interface are not illustrated for reasons of simplification.

The piezoactuator 16 in FIGS. 12 and 13 is, similar to the arrangement illustrated in FIG. 11, configured again as a stack of a plurality of piezoceramic elements (sixteen in this case). The piezoceramic elements 7 to 13 (counted from the side where the basic connection element 10 is) are combined to form a unit 280 in such a way that the electrical potential of this unit can be tapped off between a terminal 282, near to the base connection element 10, of the unit 280 and a terminal 284, near to the load connection element 28, of the unit 280.

In FIG. 12, the terminals 282 and 284 are each connected to one end of an ohmic resistor 286. Furthermore, the terminal 282 is connected to ground potential. In FIG. 13, the terminal 282 is connected to an inductor 288. This inductor 288 is connected to an ohmic resistor 286 which is in turn connected to the terminal 284. Furthermore, the terminal 282 is connected to ground potential. If the load connection element 28 carries out mechanical vibrations relative to the base connection element 10, this results in periodically fluctuating pressure on the piezoactuator 16. Owing to the piezoelectric effect, these pressure fluctuations lead to fluctuations in the charge on the surfaces of the unit 280 lying opposite. These charge fluctuations result in a fluctuation of the voltage between the terminals 282 and 284, which leads to a periodic flow of current through the electric wiring arrangement.

The arrangement in FIG. 13 acts as a damped series oscillatory circuit composed of a capacitor, an inductor and an ohmic resistor. The terminals 282 and 284 act here like the plates of a capacitor whose charge varies periodically. At each oscillation, some of the electrical energy in the ohmic resistor 286 is converted into thermal energy and the vibration is thus damped. The selection of suitable ohmic resistors and inductors is made in accordance with the method described in N. W. Hagood and A. von Flotow: Damping of Structural Vibrations with Piezoelectric Materials and Passive Electrical Networks, Journal of Sound and Vibration 146 (2), 243 (1991).

LIST OF REFERENCE NUMERALS

1 Internal interference sources
2 Active element
3 Active element
4 Transmission paths
5 Sensitive elements
10 Base connection element
12 Pretensioning device
14 Support element
16 Piezoactuator of the first actuator system between base connection element 10 and load connection element 28
18 Piezoactuator of the first actuator system between base connection element 10 and load connection element 28
20 Engagement point of the actuator 16 on the base connection element 10
22 Engagement point of the actuator 18 on the base connection element 10
24 Engagement point of the actuator 16 on the load connection element 28
26 Engagement point of the actuator 18 on the load connection element 28
28 Load connection element
30 Piezoactuator of the second actuator system between support element 14 and load connection element 28
32 Piezoactuator of the second actuator system between support element 14 and load connection element 28
34 Engagement point of the piezoactuator 30 on the support element 14
36 Engagement point of the piezoactuator 32 on the support element 14
38 Engagement point of the piezoactuator 30 on the load element 28
40 Engagement point of the piezoactuator 32 on the load element 28
42 Axis of symmetry
60 Acceleration sensor
62 Phase shifter
64 Electronic closed loop control system
66 First postamplifier
68 180.degree. phase shifter
70 Second postamplifier
80 First actuator pair
82 Second actuator pair
84 Third actuator pair
88 Tilting axis
90 Tilting axis
92 Tilting axis
100 Piezoactuator
102 Engagement point of piezoactuator 100 on the base connection element
104 Engagement point of the piezoactuator 100 on the load connection element
106 Piezoactuator
108 Engagement point of the piezoactuator 106 on the load connection element
110 Engagement point of the piezoactuator 106 on the support element
130 Piezoactuator
132 Engagement point of the piezoactuator 130 on the base connection element
134 Engagement point of the piezoactuator 130 on the load connection element
136 Piezoactuator 140 Engagement point of the piezoactuator 136 on the load connection element
142 Engagement point of the piezoactuator 136 on the support element Opening in the base connection element for electric feedlines to the piezoactuators
160 Piezoactuator
162 Piezoactuator
164 Engagement point of the piezoactuator 160 on the base connection element
166 Engagement point of the piezoactuator 162 on the base connection element
168 Engagement point of the piezoactuator 160 on the load connection element
170 Engagement point of the piezoactuator 162 on the load connection element
172 Piezoactuator
174 Piezoactuator
176 Engagement point of the piezoactuator 172 on the support element 180
178 Engagement point of the piezoactuator 174 on the support element 180
180 Support element
182 Engagement point of the piezoactuator 172 on the load connection element
184 Engagement point of the piezoactuator 174 on the load connection element
190 Piezoactuator
192 Piezoactuator
194 Engagement point of the piezoactuator 190 on the base connection element
196 Engagement point of the piezoactuator 192 on the base connection element
198 Engagement point of the piezoactuator 190 on the load connection element
200 Engagement point of the piezoactuator 192 on the load connection element
202 Piezoactuator
204 Piezoactuator
206 Engagement point of the piezoactuator 202 on the support element 210
208 Engagement point of the piezoactuator 204 on the support element 210
210 Support element
212 Engagement point of the piezoactuator 202 on the load connection element 28
214 Engagement point of the piezoactuator 204 on the load connection element 28
216 Pretensioning device
218 Pretensioning device
230 Piezoactuator
232 Engagement point of the piezoactuator 230 on the base connection element 10
234 Engagement point of the piezoactuator 230 on the load connection element 28
236 Piezoactuator
238 Engagement point of the piezoactuator 236 on the support element 180
240 Engagement point of the piezoactuator 236 on the load connection element 28
242 Piezoactuator
244 Engagement point of the piezoactuator 242 on the support element 210
246 Engagement point of the piezoactuator 242 on the load connection element 28
260 Variable voltage source
262 Switch
264 First electrode of the piezoceramic element 268
266 Second electrode of the piezoceramic element 268
268 Piezoceramic element
270 Measuring device
280 Combined unit composed of piezoceramic elements of the piezoactuator 16
282 Terminal of the unit 280 near to the base connection element 10
284 Terminal of the unit 280 near to the load connection element 28
286 Ohmic resistor
288 Inductor

The invention claimed is:

1. An interface for reducing mechanical vibrations, comprising:
 a base connection element,
 a load connection element,
 at least one support element,
 at least a first energy converter system extending between at least one engagement point located on the base connection element and at least one engagement point located on the load connection element;
 at least one second energy converter system extending between at least one engagement point located on the support element and at least one engagement point located on the load connection element;
 at least one elastic pretensioning device connecting said base connection element to said support element for exerting a compressive preload on the first energy converter system and on the second energy converter system, said pretensioning device being embodied as an elastic pipe which surrounds the energy converter systems;
 wherein the load connection element has a part located in an intermediate space between the base connection element and the support element, and a part located outside the intermediate space between the base connection element and the support element.

2. The interface as recited in claim 1, characterized in that the energy converter systems include at least one of the following elements:
 a piezoactuator,
 a shape memory alloy actuator,
 an electrorheological or magnetorheological fluid actuator or fluid damper,
 an electrostrictive or magnetostrictive actuator.

3. The interface as recited in claim 1, characterized in that at least one sensor system is connected to the load connection element for determining at least one of the following parameters: travel, velocity, acceleration, force.

4. An arrangement for reducing mechanical vibrations, characterized by
 an interface as recited in claim 1,
 at least one system which acts as at least one of the following: a movement sensor, an acceleration sensor, a velocity sensor, a force sensor, and
 an electronic circuit which generates, from a signal developed by the at least one system, a target function for actuating the energy converter systems of the interface.

5. An arrangement for reducing mechanical vibrations, characterized by
 an interface as recited in claim 1, and
 an electronic circuit operatively associated with said interface for providing passive or semi-active vibration reduction.

6. An arrangement for reducing mechanical vibrations, characterized in that a plurality of interfaces as recited in claim 1 are connected in such a way that in each case the base connection element of the following interface is connected to the load connection element of the preceding interface.

7. An interface for reducing mechanical vibrations, comprising:
  a base connection element;
  a support element separated from the base connection element by an intermediate space;
  a load connection element having a first part and a second part, said first part being located in said intermediate space, and said second part being located outside of said intermediate space;
  a first energy converter system extending between a first engagement point located on the base connection element and a second engagement point located on the load connection element, and
  a second energy converter system extending between a third engagement point located on the support element and a fourth engagement point located on the load connection element; and
  an elastic pretensioning device connecting the base connection element to the support element in such a way that the elastic pretensioning device exerts a preload on the first energy converter system and on the second energy converter system, the pretensioning device being embodied as an elastic pipe which surrounds said first and second energy converter system.

8. An interface as recited in claim 7, characterized in that said first and second energy converter systems include at least one active element selected from the group consisting of
  a piezoactuator,
  a shape memory alloy actuator,
  an electrorheological fluid actuator,
  a magnetorheological fluid actuator,
  a fluid damper,
  an electrostrictive actuator, and
  a magnetostrictive actuator.

9. An interface as recited in claim 7, characterized in that at least one sensor system adapted to determine travel and/or velocity and/or acceleration and/or force is connected to the load connection element.

10. An interface as recited in claim 7, characterized in that at least one of said first and second energy converter systems can convert mechanical energy into electrical energy.

11. An arrangement for reducing mechanical vibrations, comprising:
  an interface as recited in claim 7,
  at least one system which acts as a movement sensor and/or acceleration sensor and/or velocity sensor and/or force sensor,
  and an electronic circuit which generates, from a signal of said one system, a target function for actuating the energy converter systems of the interface.

12. An arrangement for reducing mechanical vibrations, comprising:
  an interface as recited in claim 11,
  wherein said electronic circuit cooperates with said energy conversion systems to accomplish passive or semi-active vibration reduction.

13. An arrangement for reducing mechanical vibrations, characterized in that a plurality of interfaces as recited in claim 7 are connected in such a way that in each case the base connection element of the following interface is connected to the load connection element of the preceding interface.

* * * * *

UNITED STATES PATENT AND TRADEMARK OFFICE
CERTIFICATE OF CORRECTION

PATENT NO.        : 7,637,359 B2                                                          Page 1 of 1
APPLICATION NO.   : 10/565469
DATED             : December 29, 2009
INVENTOR(S)       : Tobias Melz et al.

It is certified that error appears in the above-identified patent and that said Letters Patent is hereby corrected as shown below:

Title Page (75) Inventors:

First co-inventor Tobias Melz is shown as residing in "Herdweg (DE)", please delete "Herdweg (DE)" and replace with "Darmstadt (DE)", as it should read.

Second co-inventor Michael Matthias is shown as residing in "Herdweg (DE)", please delete "Herdweg (DE)" and replace with "Darmstadt (DE)", as it should read.

Third co-inventor Holger Hanselka is shown as residing in "Heinrich-Delp-Str. (DE)", please delete "Heinrich-Delp-Str. (DE)" and replace with "Darmstadt (DE)", as it should read.

Signed and Sealed this

Thirteenth Day of July, 2010

David J. Kappos
*Director of the United States Patent and Trademark Office*